Nov. 9, 1965 L. HILLMAN 3,217,306
DATA CONTROL SYSTEM
Filed Sept. 8, 1961 3 Sheets-Sheet 2
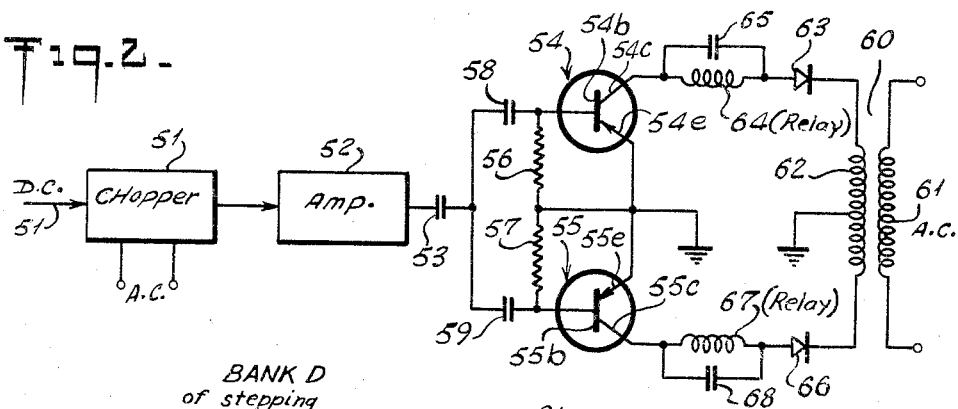
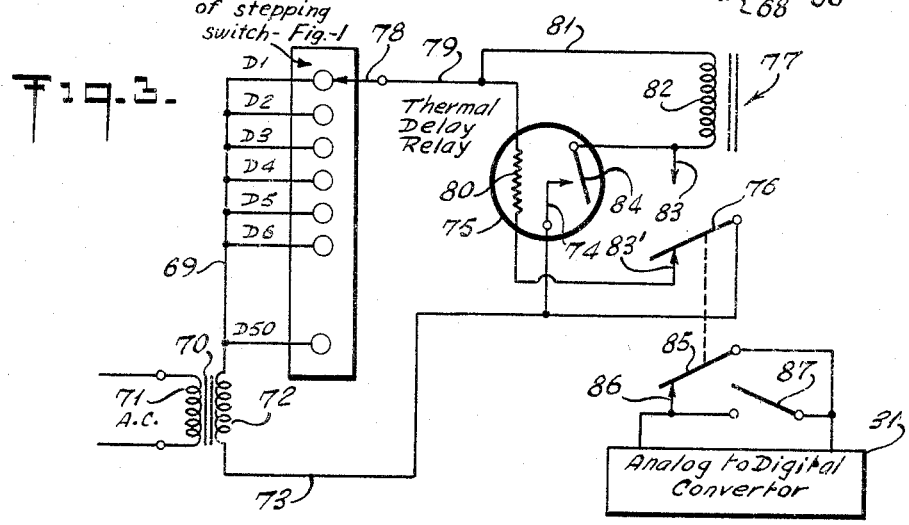
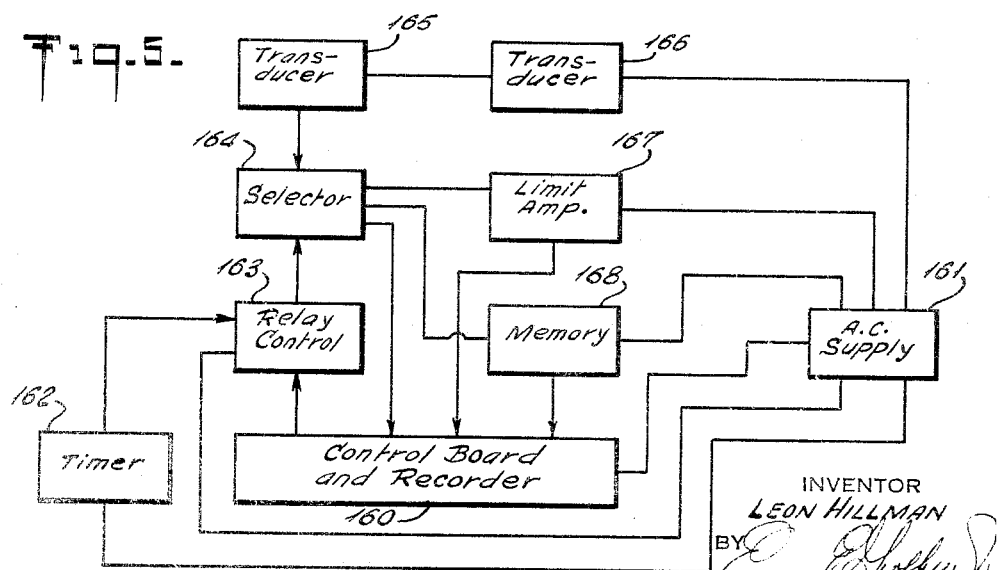
INVENTOR
LEON HILLMAN
BY
ATTORNEY

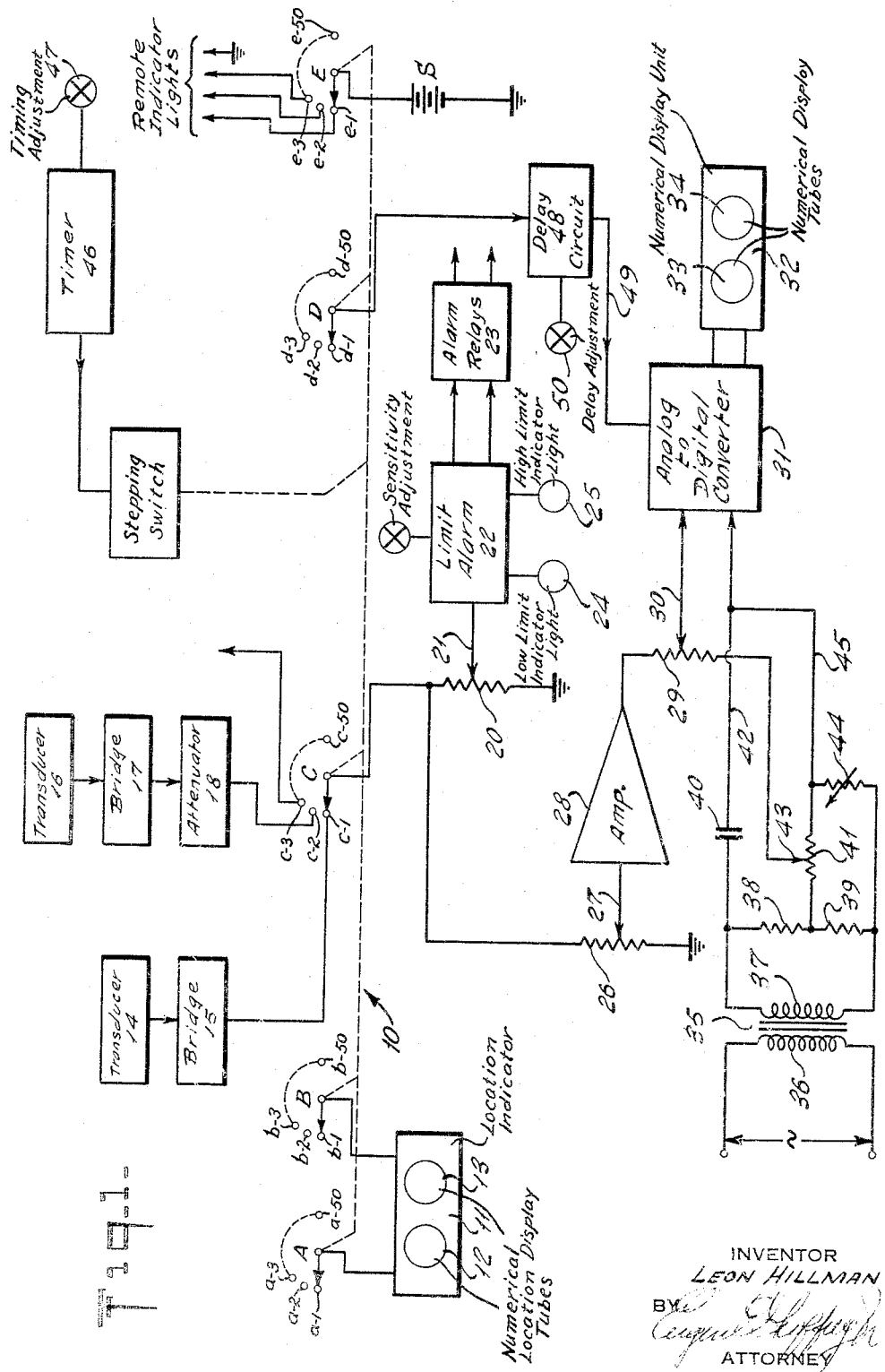

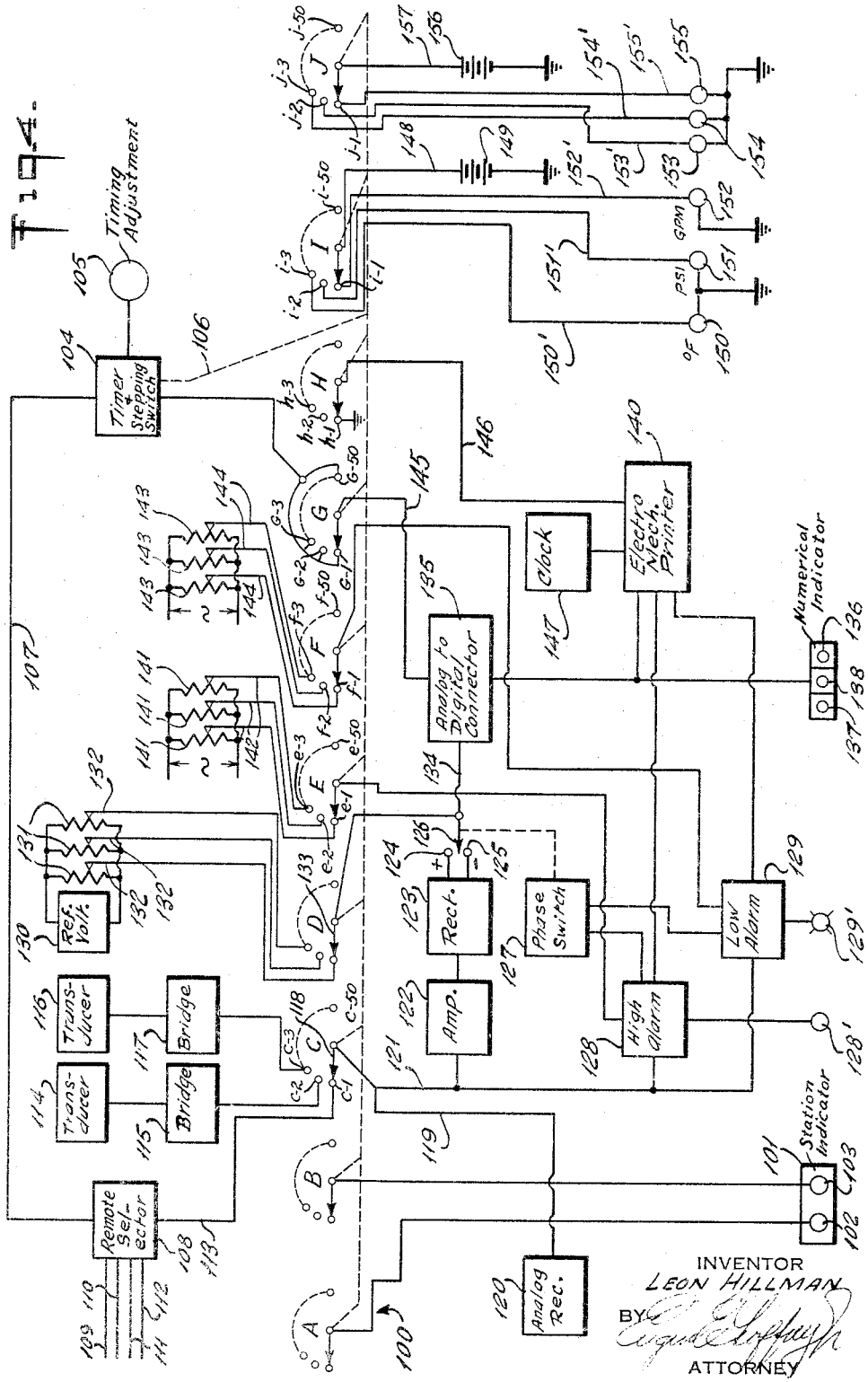

United States Patent Office 3,217,306
Patented Nov. 9, 1965

3,217,306
DATA CONTROL SYSTEM
Leon Hillman, Englewood, N.J., assignor to Johnson Service Company, Milwaukee, Wis., a corporation of Wisconsin
Filed Sept. 8, 1961, Ser. No. 136,849
5 Claims. (Cl. 340—181)

This invention relates to data control systems and more specifically to novel and improved method and apparatus for measuring and indicating, at a central location or center, physical conditions existing at a plurality of remotely located positions. Devices of this nature are generally referred to as supervisory data control centers.

Data control centers have been proposed for monitoring the operation of apparatus such as that used in chemical processes, refineries, heating plants and the like, but have not been found satisfactory for many reasons including complexity, relatively high cost, and the need for mental computation in order to produce useful results. This invention overcomes the difficulties with prior known devices and has as one of its objects the provision of a novel and improved system which is characterized by its simplicity, versatility, and improved presentation of data so that the results may be quickly and easily interpreted without the need for additional computation. The supervisory control center in accordance with the invention is useful for a variety of applications including the monitoring of physical conditions such as pressure, temperature, humidity, voltage, current, frequency, acidity of solutions and the like.

In the case of heating and air-conditioning systems which may include widely separated units, the data control center in accordance with the invention enables a single individual to monitor the entire system and at the same time, check temperatures at different locations of the area or space being cooled or heated, as the case may be. Thus a single operator can constantly monitor an entire system, and at the same time, keep a permanent record of the operation of the apparatus. Because of the unique arrangement of elements the information can be displayed easily at a plurality of positions if desired, and at the same time, a physical display of the apparatus being monitored may be utilized with appropriate signal lights to show the precise location of each measurement as it is being made. In this way, should difficulties arise in a particular part or parts of the apparatus, such difficulties can be located by immediate reference to such physical display.

Another object of the invention resides in the provision of an improved system for sampling a plurality of physical conditions at one or more remote positions and displaying the information in terms of a common parameter and simultaneously therewith affording an indication when the physical conditions exceed predetermined normal limits.

Still another object of the invention resides in the provision of a novel and improved data logging and display system which includes means for sampling a plurality of physical conditions and displaying said conditions simultaneously with a display of the particular parameter being measured and presenting indications when a particular measured parameter exceeds or falls below a normal range. The system may further include means for holding any particular measurement being displayed and for manually or automatically holding the display of an abnormal or subnormal condition.

A further object of the invention resides in the provision of a novel and improved data logging and display system embodying the adjustment of scale factors and reference voltages to effect direct and accurate readings of the conditions being sampled.

A further object of the invention resides in a novel and improved limit amplifier for detecting and signalling the existence of subnormal and abnormal conditions.

A still further object of the invention resides in a novel and improved data logging and display system which embodies a digital display coordinated with the switching means to insure accurate and precise measurement of the conditions being sampled.

The above and other objects and advantages of the invention will become more apparent from the following description and accompanying drawings forming part of this application.

In the drawings;

FIG. 1 is a diagrammatic view of one embodiment of the data logging and display system in accordance with the invention;

FIG. 2 is a diagram of an improved limit amplifier for detecting abnormal or subnormal conditions;

FIG. 3 is a diagram showing an improved circuit for controlling the analog-to-digital converter;

FIG. 4 illustrates another embodiment of a data logging and display system in accordance with the invention; and FIG. 5 is a block diagram showing a still further embodiment of the invention.

The data logging and display system in accordance with the invention affords a highly versatile and precise sampling method and apparatus which may be utilized for sampling physical or electrical conditions at a plurality of remote positions and presenting the data at one or more locations. Through an improved treatment of the mode of such conditions, the data presented can be quickly and easily interpreted and at the same time signals may be provided to indicate departures of measured conditions from predetermined ranges of operation. By reason of the improved arrangement and coordination of elements the apparatus may be readily utilized for measuring sets of conditions at different locations and provide an immediate and direct indication of each condition.

The speed of the sampling procedure can be controlled over relatively wide limits and in many instances exceedingly rapid data presentation may be effected by utilizing electromechanical printing apparatus and at the same time providing an alarm when any individual condition departs from a normal range of operation. Thus, a single operator or attendant may be utilized with one or more systems now to be described, since his attention is not constantly required at any single data presentation console.

Referring now to the drawings, and specifically to FIG. 1, the numeral 10 generally denotes a selector switch which in the instant embodiment of the invention includes banks A through E, inclusive. While selector switches are well known in the art and a detailed description is not deemed necessary, such selector switches customarily have a plurality of circular or semicircular arrays of contacts positioned in parallel relationship and contacting arms driven by a common shaft for moving the arms simultaneously to successively engage the contacts of the associated banks. The shaft may be driven by a relay actuated ratchet and pawl in order to step the movable contactors from one contact to the next. Other sysems for periodically advancing the contactors simultaneously and even continuously advancing the contactors may, of course, be employed.

Each of the contact banks A through E usually include the same number of contacts and in the instant embodiment of the invention, the contacts of bank C are denoted by the numerals c–1 through c–50. For simplicity, only certain of the contacts have been illustrated on bank C though it is understood that banks A, B, D and E will also be included.

Banks A and B are connected to a visual display device 11 which may include a pair of neon display tubes having numerals 1 through 9 and 0, which are selectively illuminated by the application of predetermined potentials. These tubes are identified by the numerals 12 and 13, with the tubing 12 being actuated by the contact bank A and the tube 13 by the contact bank B. By wiring the switch contacts of bank A so that when the movable contactor traverses contacts 1 through 9, the display tube 12 will read zero and when the movable contactor traverses contacts 10 through 19 it will operate the tube 12 to display the numeral 1, etc. The contacts of bank B are wired to operate the tube 13 to display digits. Thus, contacts 1, 11, 21, etc., of bank B would actuate the tube 13 to display the numeral 1; contacts 2, 12, 22, etc. would display the numeral 2. In this way, as the selector switch 10 is actuated, the tubes 12 and 13 will automatically indicate the number of the contact in each bank engaged by the associated contacting arm. By relating the contact numbers with each of the physical conditions being sampled, the display 11, which may be more aptly termed "station indicator" will identify each specific condition as it is sampled. While the indicator 11 only provides for the display of tens and units, it is evident that an additional bank of contacts could be utilized so that hundreds as well as tens and units can be indicated.

The bank C is utilized to sample the conditions to be measured. For this purpose appropriate conversion apparatus is utilized so that the magnitude of each condition is presented to the selector switch in terms of a proportional voltage. Let it be assumed that the contact $c-1$ of bank C is connected to indicate a temperature at a predetermined location. For this purpose the block 14 would be in the form of a temperature sensing device such as a suitable resistor, thermistor or the like. This temperature sensing element is connected to a Wheatstone bridge represented by the block 15. The bridge will produce an output voltage corresponding to the change in resistance of the element 14 and for purposes of convenience, let it be assumed that the bridge will produce a change of 10 millivolts for each degree Fahrenheit change in temperature. This voltage is fed to the fixed contact $c-1$ of the bank C. Wheatstone bridges and temperature sensing elements are well known in the art and accordingly a detailed description and drawing are not deemed necessary. Now let it be assumed that the contact $c-2$ is to record a gas or liquid pressure. For this purpose a suitable pressure transducer may be employed and such transducer is represented by the block 16. Pressure transducers for effecting a change in resistance of an electrical element that is proportional to changes in pressure are well known and a detailed description is not deemed necessary. The transducer is connected to a pressure bridge such as a Wheatstone bridge which converts a change in resistance to a proportionate change in voltage. This bridge is illustrated by the block 17. The output voltage of the bridge is fed to an attenuator 18 which is utilized for modifying the output voltage from the bridge 17 so that the signal fed from the attenuator to contact $c-2$ will have substantially the same voltage change per unit of pressure change as the voltage change per unit of temperature change. Thus, the attenuator 18 would be set to produce an output of approximately 10 millivolts for each p.s.i. change in pressure. Other similar conditions to be sampled by the apparatus would be connected to contacts $c-3$ through contacts $c-50$, and it is quite evident that electrical conditions as well as pressure, temperature, humidity and the like may also be measured by well known apparatus. In each instance, the signal ultimately fed to a switch contact $c-1$ through $c-50$ is preferably adjusted so that the change in voltage effected by each condition being measured corresponds to a change in a standard unit for the measurement of that condition.

As previously described, the switch contacts $c-1$ through $c-50$ are successively sampled by the movable contactor 19 and the contacts of banks A, B, D and E are successively engaged by associated movable contactors. The switch arm 19 of bank C is connected through a potentiometer 20 to ground and the arm 21 of the potentiometer is fed to a limit alarm 22 and thence to alarm relays 23. The limit alarm 22 may assume any desired form that will produce a signal when the voltage applied to the alarm is above or below a predetermined value and suitable adjustments may be provided for this purpose. One form of limit alarm and associated relays that may be utilized for this purpose will be described in connection with FIG. 2 of the drawings. The alarm is provided with low and high indicator lights 24 and 25, respectively and the signals actuating said lights are also utilized to selectively actuate the alarm relays and produce output signals that may be utilized to provide other audible or visual alarms. In cases where the conditions being sampled are substantially uniform, all the conditions must operate within substantially similar limits so that the range of variation of voltages at each of the contacts for normal operating conditions at each location are uniform. Then the limit alarm can be actuated by a preset voltage obtained from the potentiometer 20, as illustrated. In the event the normal range of voltages presented to the contacts $c-1$ to $c-50$ vary, then means would be provided as will be described in connection with FIG. 4 to apply a predetermined bias on the limit alarm for each of the several contacts $c-1$ through $c-50$, so that the high and low limit signals can be adjusted to function properly for each specific condition.

The output signal from the arm 19 is fed through a second potentiometer 26 and then to ground. The potentiometer arm 27 is fed to an amplifier 28 and the output is fed to one end of a potentiometer 29. The contactor 30 of the potentiometer is connected to the analog-to-digital converter 31. The potentiometers 26 and 29 are utilized to adjust the scale factor of the signals being fed to the converter so that the digital output display 32 which has display tubes 33 and 34 similar to the display tubes 12 and 13 previously described, will present readings in terms of the original conditions being sampled. For instance, in reading temperature, if the tubes 33 and 34 indicate a reading of 15, then it will be known that the reading is 15 degrees F. In the case of pressure, a reading of 15 would indicate 15 lbs. p.s.i.

While it will be shown that the electrical signals fed to contacts $c-1$ through $c-50$ can be either A.C. or D.C., in the instant embodiment of the invention A.C. signals are utilized and accordingly, means for injecting an A.C. current reference signal is provided in order to coordinate the operation of the converter with the input signals applied thereto, so that a precise reading will be obtained. The reference signal is produced by a transformer 35 having an input primary winding 36 and a secondary winding 37. A pair of resistors 38 and 39 are connected in series across the winding 37. The upper terminal of the resistor 38 is connected through a condenser 40 and thence to the converter 31. A potentiometer 40 is connected from the center tap of the resistors 38 and 39 to the lead 42 connecting condenser 40 to the converter. The bottom end of the potentiometer 29 is connected to the contactor 43 forming part of the potentiometer 41. A rheostat 44 is connected from the bottom side of the resistor 39 to the lead 42 via a lead 45. With this arrangement a voltage will be developed across the potentiometer 41 and this voltage, in being fed to the bottom side of the potentiometer 29, will provide a reference voltage which, together with the adjustment of the scale factor potentiometers 26 and 29, will enable the coordination of the readings displayed on the indicator 32 with the conditions actually being measured. The rheostat 44 cooperates with the condenser 40 to modify the phase of the reference signal so that it can be properly synchronized with the output voltage from the amplifier 28.

The selector switch 10 is operated by a timing control 46 which includes an adjustment 47 for selecting the rate at which the movable contactors will scan the associated fixed contacts of each bank. The timing control 46 may take any desirable form, since it need only produce periodic voltage pulses to actuate the stepping relay of the switch 10.

The switch deck D is utilized to present information to the converter 31 for the purpose of delaying the action of the converter until all of the movable contactors have attained a position of rest. For this purpose the fixed contacts of the bank D are arranged with a voltage supply to transmit an energy pulse to the holding circuit identified by block 48. This holding circuit may take any desired form as for instance, a standard, single action, multi-vibrator or flip-flop, which upon being actuated by a momentary pulse, will produce a second output pulse after the lapse of a predetermined interval of time. This output signal is fed via the lead 49 to the converter and momentarily places the converter in an operable condition to read the signal being presented by the amplifier 28. By utilizing the holding circuit 48 noise produced by the movement of the switch arms from one set of contacts to the next set of contacts will not affect the converter and thereby avoid incorrect readings on the indicator 32. Since selector switches such as the selector switch 10 vary in their mode of operation with changes in the speed of operation, the holding circuit 48 may be provided with an adjustment 50 to modify the delay in the production of an output pulse after it is energized by an actuating pulse.

The switch deck E in the instant embodiment of the invention is utilized for many purposes as for instance the actuation of remote panel indicator lights or lights on a physical display or layout of the plant or building. In the latter case the contacts e to e–50 as shown in the figure would be connected to lamps in the physical display, and the movable contactor would be energized by a suitable source of energy such as battery S. Alarm signals and station indications as described above may of course be displayed at other remote stations. As will be shown, means may be included for interrupting the scanning operation upon the presentation of an alarm signal and thus the remote panel would not only indicate an alarm but would also afford an indication of the precise station or condition which has departed from normal operation.

FIG. 2 illustrates a limit amplifier which may be utilized for producing high and low signals. While it will become evident that such device may be actuated by both A.C. and D.C. signals, the circuit has been illustrated for use in connection with D.C. signals. The input D.C. signal is variable in both amplitude and polarity and is applied to the lead 51'. Such signal may be obtained, for instance, from the movable contact 19 as shown in FIG. 1 or possibly from the output of the amplifier 28 of that figure. Inasmuch as the signal is in a D.C. form it is first fed to a chopper 51 which converts it to an A.C. signal. This signal will vary in phase and in accordance with the polarity of the D.C. signal. The amplitude of the A.C. signal is of course proportional to the amplitude of the D.C. signal. The output of the chopper is fed to the amplifier 52 and thence through the condenser 53 and condensers 58, 59 to transistors 54 and 55. The bases 54B and 55B of the transistors are connected to ground through resistors 56 and 57, respectively, while the emitters 54E and 55E are connected directly to ground. Rectified A.C. current voltage is fed to the collectors of the two transistors, the source of the A.C. current voltage being in the form of a transformer 60 having a primary 61 and a center tap secondary 62. The center tap is connected to ground and one side of the winding is connected through a rectifier 63 and relay 64 to the collector 54C. A condenser 65 is connected in parrallel with the relay. The other side of the winding 62 is connected through a halfwave rectifier 66 and a relay 67 to the collector 55C. A condenser 68 is connected in parallel with the relay 67. Since rectified A.C. current is supplied to the collectors, it is apparent that the collectors will be alternately energized in phase with the A.C. current. Since the chopper is actuated by the same A.C. current feeding the transistors 54 and 55, and assuming negligible phase shift in the amplifier 52, the signal fed to the bases of the transistors 54 and 55 will either have its positive half cycles in phase with the rectified energy pulses applied to the collector 54C or in phase with the rectified energy applied to the collector 55C, depending on the polarity of the D.C. signal applied to the chopper. If the positive half cycles of the converted and amplified D.C. signal are in phase with the voltage applied to the collector 54C, then if the voltage applied has a sufficiently high magnitude, it will actuate the relay 64 and indicate the attainment of a high limit. Should the polarity of the D.C. be reversed as a result of a low reading on the condition being sampled, then the reverse magnitude of the positive half cycles, if of sufficient strength, will actuate the relay 67 to indicate that the low limit has been reached. Thus, a single amplifier will function to provide both high and low limit indications. With reference to the production of the D.C. signal, if the bridge 15, for instance, in FIG. 1, is energized with D.C. and is balanced at the mean reading for the condition being sampled, then if the condition exceeds the means value, the output D.C. will have one polarity and if it drops below the mean value, the D.C. output will have an opposite polarity.

In the description of FIG. 1 it was pointed out that the analog-to-digital converter 31 is operated in such a manner that it will not read a sampled condition until after the stepping switch 10 is at rest on a particular set of contacts for reading a selected condition.

The delaying or holding circuit is shown in FIG. 3 and it will be observed that the deck D of the switch 10 has a plurality of contacts d–1, d–2 through d–50, all of which are tied together by a conductor 69. A transformer 70 having a primary winding 71 and a secondary winding 72 provides an operating voltage for the delay network. One side of the winding 72 is connected to the conductor 79 while the other side is connected through a conductor 73 to a fixed contact 74 of a thermal delay relay 75 and to the movable contactor 76 of a relay generally denoted by the numeral 77. The moving arm 78 of the selector switch 10 which cooperates with the deck D is connected by lead 79 to one side of the heating element 80 of the thermal delay and through a lead 81 to one side of the relay coil 82 of the relay 77. The other side of the relay coil 82 is connected to a relay contact 83 and to a movable heat responsive element 84 in the thermal delay 75. The element 84 alternately opens and closes in response to the heating and cooling of the heater 80. The relay 77 further includes a movable relay contactor 85 and a fixed contact 86 which are connected to shortcircuit the analog-to-digital converter 31. A switch 87 bridges the cooperating relay contacts 85 and 86 so that the converter can be permanently shorted by closing the switch 87 or can be permitted to operate in response to the control system. In the operation of this circuit the converter 31 is normally shortcircuited by the cooperating relay contacts 85 and 86. When the arm 78 is on contact d–1, it will produce a flow of current through the heater 80 causing it to increase in temperature, whereupon the contacts 74 and 84 of the thermal delay will close. In so doing, the relay 77 is energized to open the relay contacts 85 and 86 to permit the analog-to-digital converter to sample the selected condition. At the same time contactor 76 moves from the relay contact 83' to the contact 83 which maintains the relay in an energized condition and permits the heater 80 to cool. During this cooling period the contacts 74, 84 open, but relay 77 still maintains in the locked energized condition. When the contactor 78 is moved to the contact d'2, there is a momentary break in the circuit of relay 77 which released the relay to short the analog-todigital converter 31 and initiate heating of the heater 80. At a fixed interval after the contactor 78 is at rest on contact d–2, the thermal delay contacts 74, 84 will close, energizing the relay and again permitting the analog-to-digital converter to record the signal on contact d–2.

A modified form of the invention is illustrated in FIG. 4. In this figure the selector switch is denoted by the numeral 100 and it is provided with contact decks A through J. Decks A and B operate in the same manner as decks A and B described in connection with FIG. 1 and function to indicate, by means of an indicator 101 and having indicator lights 102 and 103, the particular station at which a condition is being sampled. The indicator lights 102 and 103 are identical to the indicating lights denoted by the numerals 12 and 13 of FIG. 1.

Each of the decks of switch 100 will generally include an equal number of contacts as, for instance, 50 contacts, though any other number of contacts of each bank may be utilized. The selector switch 100 is operated by a timer control 104 which corresponds in certain respects to the timer 46 of FIG. 1 and includes adjusting means 105 to control the periodicity of the timer. Actuation of the switch is effected through the coupling 106 which operates the drive mechanism of the switch 100 and which mechanism is of a conventional arrangement as previously described. The timer 104 is also connected through a lead 107 to a remote selector 108 for sequentially sampling a plurality of conditions fed to the selector over leads 109, 110 and 111 and 112. The production of the condition signals fed to the remote selector 108 will be accomplished in much the same manner as described in connection with FIG. 1, which involves sensing means for sampling conditions such as temperature, pressure or electrical energy and the like to produce voltages of proportional magnitudes. The remote sensing or multiplexing simplifies the utilization of the invention since it is possible to automatically sample a plurality of conditions at a remote point and transmit the data to the control center sequentially over a single line. Accordingly the remote selector 108 in the instant embodiment of the invention is connected to the sampling deck C by means of the lead 113 which is connected to contact c–1. In the utilization of such remote selection, the timer 104 is arranged to operate the remote selector 108 and at the same time delay advancement of the switch 100 from its first position until after the remote selector 108 has completed its cycle.

Contact c–2 of deck C in the instant embodiment of the invention is arranged to sample a temperature condition and accordingly is provided with a temperature responsive element 114 and a sensing bridge 115, the output of the latter being connected directly to contact 2. Contact c–3 of the deck C is arranged to record pressure and accordingly is provided with a pressure sensing transducer 116 and a responsive bridge 117 which produces an electric signal corresponding to the pressure being sampled. It is evident that the other contacts may also be connected to measure or sample other remote conditions. The cooperating, moving contactor 118 of deck C is connected via a lead 119 to an analog recorder 120 introduced to provide a direct reading of the conditions existing at each of the several switch contacts. In addition, the contactor 118 is connected via the lead 121 to an A.C. amplifier 122, it being understood that the electrical signals presented to the contacts c–1 through c–50 are in A.C. form, with substantially zero voltage being presented when the condition being sampled is normal. This means that if the condition exceeds normal value, the output A.C. signal will be of one phase and a magnitude corresponding to the deviation and if the condition is below normal, it will produce an A.C. signal of reversed phase and a magnitude corresponding to the below normal deviation. The output of the amplifier 122 is rectified by the rectifier 123 and corresponding positive and negative output voltages are provided at terminals 124 and 125, respectively. These terminals form part of a switch having a movable contactor 126 which is mechanically actuated by phase switching means 127. The phase switching means is in turn actuated by a high alarm 128 and the low alarm 129. The alarms 128 and 129 are each connected to the lead 121 so that the signals arriving at deck C will also actuate the two alarms. The alarm 128 functions if the signal exceeds a predetermined value, while the alarm 129 functions if the signal falls below a predetermined value. The alarm signals may be in any desired form as, for instance, suitable lights 128′ and 129′ or audible sounds. If the phase of the signal from deck C indicates a deviation above a normal value, the alarm 128 functions to operate the phase switching means 127 to move the contactor 126 to the switch point 124. Conversely, if the signal from deck C is of a phase indicating that the condition sampled is below a normal value, the alarm 129 will operate the phase switching device 127 to move the contactor 126 to the switch point 125.

With the apparatus as described thus far, the voltage appearing on the contactor 126 will be a D.C. voltage having a magnitude equal to the magnitude of the deviation of the sampled condition from a predetermined normal or set-point. In order to provide a reference corresponding to the set-point or normal value of the condition deck D provides for the injection of a D.C. reference. For this purpose a stable source of direct current voltage 130 is provided, and a plurality of potentiometers 131 connected in parallel one with the other and across the supply of voltage. The contactor 132 of each potentiometer is connected to one of the contacts d–1 through d–50 of deck D. With this arrangement and with the movable arm 133 of deck D in contact with contact d–1, a D.C. voltage determined by the setting of the associated potentiometer would be applied to the contactor 126. The resultant signal on lead 134 leading to the analog-to-digital converter will then have a magnitude equal to the set-point voltage plus or minus the voltage from the rectifier 123 as the case may be. This information is transformed by the converter into a digital result and it is presented on the data display 136, which includes numeral displaying lamps 137, 138, and 139. The output of the converter 135 is also fed to an electromechanical printer 140.

The upper and lower limits for the limit alarms 128 and 129 are established by switch decks E and F. Switch deck E has a plurality of potentiometers 141 with the contactors 142 connected to individual contacts of the deck E. A source of alternating current voltage is applied across the potentiometers and each individual potentiometer is adjusted so that when the incoming signal to the high limit alarm 128 is equal to the reference voltage from deck E the alarm will operate. In this way different high limits may be set for the different conditions. The low limit alarm 129 is operated in the same manner from deck F, which is provided with a plurality of potentiometers 143 having their arms 144 connected to the individual contacts of the deck F. In this way individual high and low limits may be set for each condition being sampled.

Deck G corresponds in certain respects to deck D as described in connection with FIG. 1, in that this deck, together with the timer 104, performs a hold function to prevent the converter 135 from operating until after the switch has come to rest on a particular set of contacts. More specifically, the deck G has a movable arm which is connected via the lead 143 to the converter 135. The individual contacts of the deck G are connected together and to the timer 104. The timer therefore performs a function of shortcircuiting the converter for a definite time duration after contact has been made by deck G to be sure that all contactors are at rest, whereupon the shortcircuit is removed to permit the converter to sense the incoming voltage on lead 134. In addition, the timer 104 may also be arranged with a suitable hold switch to either stop the action of the stepping switch 100, or in the alternative, to hold a specific reading on the data display panel 136. Any suitable circuitry may be provided for this purpose as for instance the circuitry illustrated and described in connection with FIG. 3.

Deck H is utilized to determine whether or not the data received at any particular remote location is to be recorded. For example, certain of the switch contacts may be shorted to ground so that when the arm of deck H which is connected via the lead 146 to the electro-mechanical printer 140 engages a shorted contact it will prevent the printer from operating to record the data presented on the corresponding contact of deck C. Suitable timing means such as a clock 147 is also connected with the printer 140 to record the precise time at which the data is recorded.

The embodiment of the invention shown in FIG. 4 includes scale factor adjusting means so that the information presented to the display center and reproduced on the data display panel 136 will constitute a direct reading of the particular parameter being measured, as for instance degrees Fahrenheit, degrees centigrade, pounds per square inch, rate of flow, etc. The specific parameter being measured at a given remote location is indicated by means of switch deck I.

In the illustrative embodiment of the invention the movable contactor of deck I may be connected via the lead 148 to a battery 149. Indicator lamps 150, 151 and 152 representing respectively degrees Fahrenheit, pounds per square inch and gallons per minute would be connected by individual leads 150', 151' and 152' to selected contacts on switch deck I. The other terminals of the lamps would be connected to ground. In this way as the arm of switch deck I is moved by actuation of the switch 100, energy will be fed to selected lamps coordinated with the information fed to deck C so that the operator will know the nature of the information being presented on the data display panel 136.

In certain instances it may be desirable to identify the location of each remote station being sampled on a graphic display panel showing the layout of the particular plant with which the control center in accordance with the invention is being utilized. For this purpose a plurality of lamps 153, 154 and 155 etc. are mounted on the display panel and connected to individual contacts on switch deck J. The movable contactor on deck J is connected to a battery 156 or other source of voltage by the lead 157, and one side of each of the lamps 153, 154, 155, etc. is grounded. In this way, as the contactor on deck J is moved from one contact to the next, it would illuminate a lamp on the graphic display panel to show the particular location of the remote station being sampled at that moment.

It is apparent from the foregoing description that the data provided by the apparatus may be displayed at any number of locations. For instance, a control center in accordance with the invention may be utilized in each of a plurality of separate plants and a separate operator would be in attendance at each plant. Simultaneously, the data from all of the control centers could be fed to a single location so that all of the plants could be monitored by the central operator.

FIG. 5 is a block diagram showing the general layout of components in accordance with the invention and illustrating one modular arrangement of the apparatus as described generally in connection with FIGS. 1 and 4. In this figure the numeral 160 denotes the control board or panel for control of the apparatus and on which the data is displayed. A voltage supply source is denoted by the numeral 161 and supplies energy for operation of the control board 160, as well as other components of the apparatus. The timing means which determines the rate at which data is sampled at the remote locations is denoted by the block 162, and the timing pulses are fed to the relay control represented by block 163. While the relay control is denoted as a separate unit, it does in fact constitute means for periodically advancing the selector switch 164 which corresponds to the switch 10 of FIG. 1 or the switch 100 of FIG. 4. The remotely located sensing or sampling means are represented by the block 165, such sensing means constituting appropriate transducers for converting the physical conditions being sensed to electrical signals having a characteristic variable in accordance with variations in the physical condition. It is understood that while only one transducer 165 is shown in this figure, a plurality of transducers are in fact employed depending upon the capacity of the selector 164. Normally, the sensing units 165 are operated at a relatively low voltage, and accordingly a supply 166 is utilized to provide a low stable voltage for operation of a plurality of transducers 165.

The information transmitted by the transducers 165 to the selector 164 is fed directly to the control board 160 for immediate display, and to the limit amplifier 167 and the memory apparatus 168. The limit amplifier 167 corresponds essentially to the limit amplifier as described for instance in FIG. 2, and will provide indications of upper or lower limits reached by any of the conditions being sampled. The memory apparatus 168 responds to the output signals from the selector 164 and together with the limit amplifier 167 will produce an alarm signal on the control panel if any of the conditions being measured exceed predetermined values. The memory provides for the maintenance of the alarm signal while permitting the selector to continue its sampling operations. In this way an operator will know that at least one of the conditions being sampled is not within a normal range, and suitable action can be taken to correct the difficulty. Since the control board 160 also includes recording apparatus, on the presentation of an alarm signal from the memory means 168, the operator can merely scan the recorded information to determine the particular station at which difficulty has been encountered.

As is evident from the foregoing description, the invention affords an improved data control center that may be readily adapted to a wide variety of applications and affords a highly dependable and reliable device characterized by simplicity and ease of manufacture and maintenance. Moreover, the data being sampled is presented in a uniform manner so that the information presented to an operator constitutes a direct presentation that need not be converted in any manner in order to determine the true order or value of a specific condition. The control panel can be arranged for coordination with remotely located selector switches so that the selector switch on the panel itself could be utilized to sequentially operate a plurality of remotely located selector switches, and in this way greatly reduce the wiring and attendant complications involved in the transmission of information pertaining to each individual condition to the central control board.

While only certain embodiments of the invention have been illustrated and described, it is understood that alterations, modifications and changes may be made without departing from the true scope and spirit of the invention as set forth in the appended claims.

What is claimed is:

1. Data measuring and display apparatus for automatically and sequentially measuring a plurality of physical conditions and displaying said measurements comprising a plurality of transducers for individually measuring selected physical conditions at different locations, electrical means connected to each transducer and responsive to changes therein with each electrical means producing a predetermined voltage change for each unit change of the condition being measured by its associated transducer and zero voltage when the condition is normal, a selector switch having at least two banks of contacts and a cooperating contacting arm for each bank, timing means connected to said selector switch to periodically cycle said contacting arms, a connection between each of said electrical means and one of the contacts of one bank, an amplifier having an input and output, a connection between the contacting arm of said one bank and the input of said amplifier, scale factor adjusting means including at least one adjustable reference voltage source, means coupling said reference voltage with the signal at the output of said amplifier to produce a composite signal which has a magnitude equal to the reference signal when the output signal from said amplifier is zero and providing a predetermined change in magnitude for a given unit change of the conditions being measured when the amplifier signal departs from zero, indicating means, a connection between said coupling means and said indicating means, and means connected to said other bank of contacts to indicate the physical location of each condition as it is displayed on said indicating means.

2. Data measuring and display apparatus for automatically and sequentially measuring a plurality of physical conditions according to claim 1 wherein said scale factor adjusting means comprises a resistor having an adjustable contactor thereon, a connection between one end of said resistor and the output of said amplifier, a connection between the other end of said resistor and said reference voltage, and a connection between said adjustable contactor and said indicating means.

3. Data measuring and display apparatus for automatically and sequentially measuring a plurality of physical conditions according to claim 2 including an alarm for signaling the departures of said conditions from normal values and wherein said electrical means are Wheatstone bridges, said alarm being connected to the contacting arm of said one bank and comprising a chopper actuated by alternating current, a pair of amplifiers each including a relay with one amplifier being periodically energized by pulses of said alternating current during one half of each cycle and the other amplifier being periodically energized by pulses of alternating current during the other half of each cycle and alarms actuated by said relays whereby a predetermined departure of a condition in one direction will unbalance said bridge in one direction and actuate one alarm while a departure in the other direction will actuate the other alarm.

4. Data measuring and display apparatus for automatically and sequentially measuring a plurality of physical conditions according to claim 1 wherein said selector switch includes at least three additional banks of contacts and associated contacting arms, said electrical means are Wheatstone bridges operated by alternating current with each bridge producing zero voltage when its associated condition is normal, said reference voltage source is alternating current and produces a plurality of adjustable output voltages, and said coupling means includes means feeding each of said voltages to a contact on the first additional bank and a connection between the contacting arm of said first additional bank and said indicating means, and wherein said apparatus further includes high and low limit alarms comprising adjustable alternating current sources connected to the contacts of said second and third additional banks, a connection between the contacting arm of said second additional bank and said high limit alarm, a connection between the contacting arm of said third additional bank and the low limit alarm, a connection between each of said alarms and said indicating means and means in said high and low limit alarms for producing an indication when a signal received from said indicating means is at least equal to the magnitude and phase of the associated alternating current voltage received from said second and third additional banks respectively.

5. Data measuring and display apparatus for automatically and sequentially measuring a plurality of physical conditions according to claim 4 wherein said amplifier includes at least rectifying means producing signals of opposite polarity corresponding to the direction of the departure of the measured conditions from normal values, phase switching means connecting said rectifying means to said indicating means, connections between said high and low limit alarms and said phase switching means and connections between said high and low limit alarms and the input of said amplifier whereby the departure of a condition above the normal will produce a signal in one alarm to operate the phase switch in one direction and apply a rectified signal of one polarity to said indicating means and departure of a condition below the normal will produce a signal in the other alarm to operate the phase switch in the other direction and apply a rectified signal of the other polarity to said indicating means.

References Cited by the Examiner
UNITED STATES PATENTS

| | | | |
|---|---|---|---|
| 2,696,604 | 12/54 | Markow | 340—187 |
| 2,712,127 | 6/55 | Miller | 340—187 |
| 2,738,493 | 3/56 | Mesh | 340—187 |
| 2,748,375 | 5/56 | Fischer | 340—187 |
| 2,797,403 | 6/57 | Woodruff | 340—183 |
| 2,798,157 | 7/57 | Gruber | 317—146 |
| 2,901,739 | 8/59 | Freitas | 340—181 |
| 2,905,520 | 9/59 | Anderson | 340—183 |
| 2,907,932 | 10/59 | Patchell | 317—148.5 |
| 2,992,417 | 7/61 | Hoep | 340—187 |
| 3,005,978 | 10/61 | Wapner | 340—182 |

NEIL C. READ, *Primary Examiner.*

THOMAS B. HABECKER, *Examiner.*